United States Patent Office 3,355,871
Patented Dec. 5, 1967

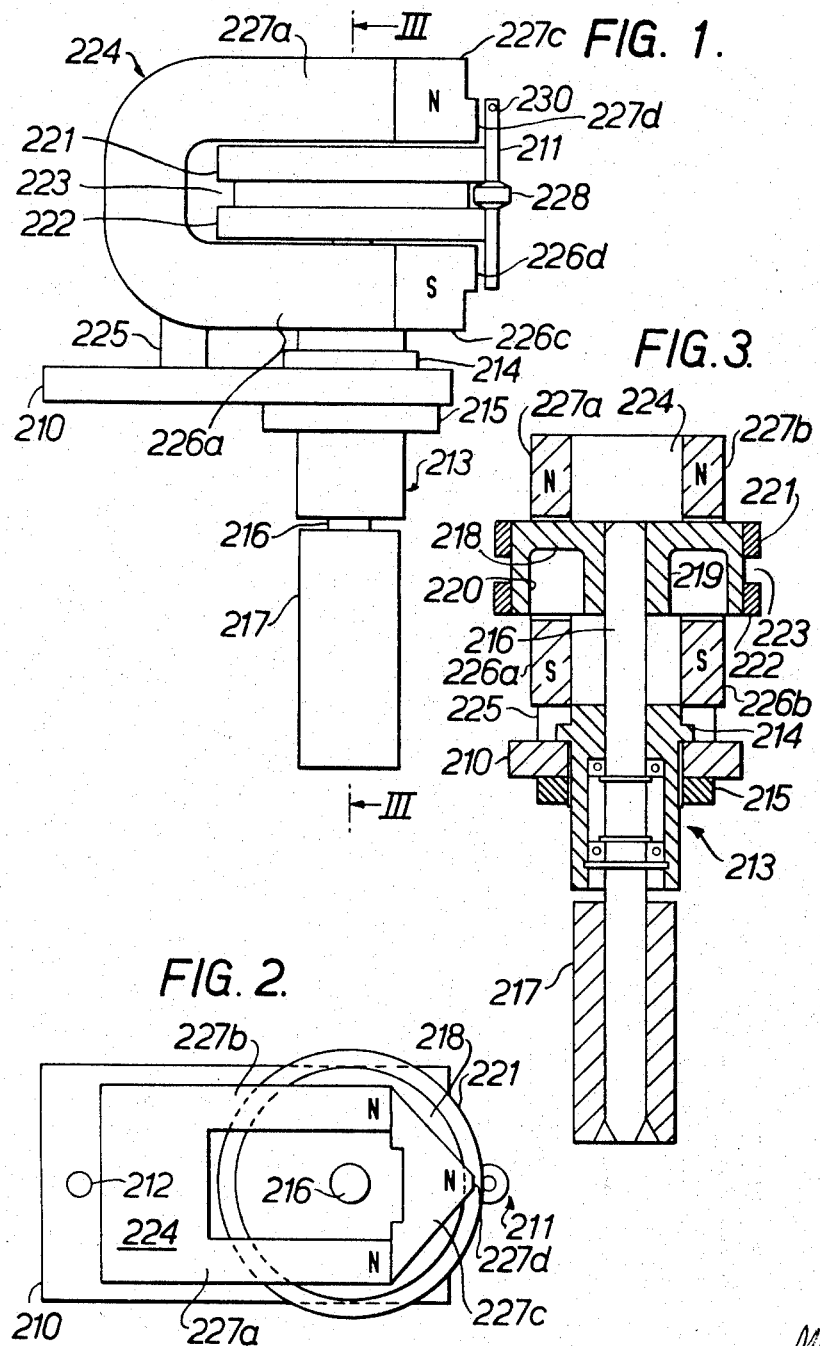

3,355,871
TRANSMISSION MEANS FOR DRIVING AND ROTATING FALSE TWIST SPINDLES
Denis Albert Edward Mattingly, London, England, assignor to The Klinger Manufacturing Company Limited, London, England, a British company
Filed Jan. 12, 1965, Ser. No. 424,952
Claims priority, application Great Britain, Jan. 17, 1964, 2,230/64
15 Claims. (Cl. 57—77.45)

This invention relates to transmission means for supporting and rotating a false twist spindle for use in false twisting yarn.

Due to the continued development over the last ten years of machines for false twisting yarn, it has become necessary to design such transmission means that are both compact and capable of rotating false twist spindles at high speeds, for example at over 180,000 revolutions per minute and if possible at 350,000 revolutions per minute and higher. Although many designs of false twist spindle transmission means have been suggested, in practice it is found that most of these are not capable of remaining stable at very high speeds or they wear and deteriorate rapidly at very high speeds, or they are not compact, or they are too expensive.

The present invention is concerned with false twist spindle transmission means in which the spindle is held against driving means by magnetic means. This type of transmission means has the difficulty that in order to keep the transmission means compact, it is necessary to limit the size of the magnetic means; the limited size of the magnetic means, particularly when using normal type magnetic means that are not too expensive, tends to place a limitation on the stability of the false twist spindle at high speeds.

The present invention is concerned with providing such transmission means of the magnetic means type which is capable of maintaining a false twist spindle stable when rotated at high speeds and which can be of compact construction, and with suitable constructions enables a false twist spindle to be rotated at very high speeds over 350,000 and with certain constructions at very high speeds in the range 400,000 to 600,000 revolutions per minute. As will be understood from the examples described later, the present invention achieves this by a combination of the design of the magnetic means and the arrangement of the driving means, and yet as also will be seen from the examples described later, the construction can be made simple, reliable, and capable of long life.

According to one aspect of the present invention there is provided a transmission means for supporting and rotating a false twist spindle for use in false twisting yarn, said transmission means comprising magnetic means having two limb portions which end in pole pieces of material of high magnetic permeability, the pole pieces reducing to tips which are arranged adjacent the ends of the spindle, the area of each said tip being small relative to the cross-sectional area of its associated limb portion and such as to concentrate the magnetic flux at said tips to a flux density greater than the flux density of the magnetic flux of said limb portions, and track means into contact with which the spindle is drawn by the magnetic means, the track means passing between said tips of the pole pieces and contacting the spindle axially inward of but adjacent said tips.

The track means is preferably formed by a wheel member. The wheel member preferably has two cylindrical tracks axially spaced apart. The spindle preferably has a ridge adapted to protrude into the gap between said two cylindrical tracks, the ridge being narrower than said gap and the arrangement being such that under normal operating conditions the ridge does not contact any part of the wheel member.

There is preferably an air gap between each said tip and the end of the spindle opposite it of 0.8 millimetre or less. This air gap can advantageously be in the range 0.2 millimetre to 0.5 millimetre.

The length of each said tip in the axial direction of the spindle can advantageously be less than one seventh of the corresponding dimension of each limb portion.

The length of each said tip in the axial direction of the spindle can advantageously be less than 2.5 millimetres.

The ratio of the area of each said tip to the cross-sectional area of each said limb portion is preferably in the range of 1:50 to 1:700.

The limb portions preferably form part of a horseshoe magnet arrangement. Each limb portion can be formed by two parallel fingers which are bridged by the appropriate pole piece. The four fingers can form part of two horseshoe magnets disposed side by side.

According to another aspect of the present invention there is provided a transmission means for supporting and rotating a false twist spindle for use in false twisting yarn, said transmission means comprising track means for contacting and rotating the spindle, magnetic means for drawing the spindle into contact with the track means, the magnetic means having two limb portions which end in pole pieces, the pole pieces being spaced apart with the track means passing between them, the pole pieces reducing to tips which are arranged adjacent the ends of the spindle, the area of each said tip being small relative to the cross-sectional area of the associated limb portion, and the outer extremities of the track means in the axial direction of the spindle being arranged to contact the spindle axially inward of and adjacent said tips of the pole pieces.

The end of each pole piece can advantageously be stepped down to form a tongue having two surfaces in planes substantially perpendicular to the axis of the spindle and a third surface joining these and disposed substantially opposite an end of the spindle to form said tip.

Preferably each limb portion has two fingers connected by the appropriate pole piece, the fingers being spaced apart in a direction perpendicular to the axis of the spindle and forming part of a permanent magnet system, and a shaft for supporting the track means passing through the space between the fingers of at least one limb portion.

According to yet another aspect of the present invention there is provided a transmission means for supporting and rotating a false twist spindle for use in false twisting yarn, said transmission means comprising a permanent magnet system having two pole pieces of material of high magnetic permeability, each pole piece reducing at its end to a tongue, a wheel member disposed between the pole pieces and protruding slightly past said tongues, the wheel member substantially filling the gap between the pole pieces, the false twist spindle having its ends substantially opposite said tongues and completing a magnetic circuit between said tongues thereby being drawn into contact with the wheel member, said tongues concentrating magnetic flux at the ends of the false twist spindle, and the arrangement being such as to render the false twist spindle stable and give it axial location at high speeds.

The present invention also contemplates a false twist apparatus incorporating a plurality of false twist spindle transmission means as described above, particularly an arrangement where a number of such transmission means are arranged to be capable of being simultaneously driven by a driving belt of the false twist apparatus.

By way of example, embodiments of the invention will now be described with reference to the accompanying diagammatic drawings, in which:

FIGURE 1 is a side elevation of one embodiment;

FIGURE 2 is a top plan view of the embodiment shown in FIGURE 1;

FIGURE 3 is a section on the line III—III in FIGURE 1;

Figure 4:
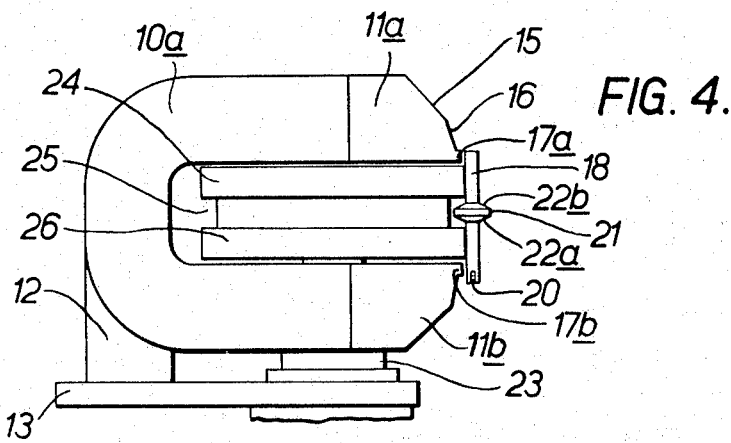
FIGURE 4 is a side elevation of another embodiment.

In the embodiment of the invention shown in FIGURES 1 to 3 there is a bracket 210 on which the device for supporting and driving a false twist spindle 211 is mounted. The bracket has a hole 212 through which it can be bolted or pivoted to the frame of an apparatus (not shown) for false twisting yarn, such as the false twist apparatus described in British patent specification No. 788,944 or No. 908,111, this embodiment shown in FIGURES 1 to 3 then taking the place of each false twist head shown in these apparatuses. A bearing 213 passes through and is secured to the bracket 210, the bearing having a flange 214 held against the upper surface of the bracket by a nut 215 tightened against the underside of the bracket. A shaft 216 is rotatably mounted in the bearing 213 which is of a type that prevents axial movement of the shaft 216 relative to the bearing. On the lower end of the shaft 216 is secured a sleeve 217 of hard wearing synthetic material. On the upper end of the shaft 216 is secured an inverted cup shaped member 218 of a light weight non-magnetic alloy, the member 218 having an internal boss 219 (see FIGURE 3) in which the upper end of the shaft 216 is non-rotatably secured. The member 218 has a cylindrical part 220 on the outside of which are secured two bands 221, 222 of hard wearing rubber-like syntheic material. The bands 221, 222 are spaced apart so that there is a groove 223 between them.

A powerful horseshoe magnet 224 is securely mounted on the bracket 210 by means of a support 225 and the upper part of the bearing 213. The lower limb of the magnet is in the form of two fingers 226a, 226b to enable the shaft 216 to pass between them. For symmetry, the upper limb of the magnet is in the form of similar fingers 227a, 227b. The fingers 226a, 226b are connected by a South Pole piece 226c, and the fingers 227a, 227b are connected by a North pole piece 227c. Both pole pieces are identical and taper, as shown in FIGURE 2, to a very narrow flat 226d, 227d which is stepped down to approximately half the thickness of the respective pole piece, as shown in FIGURE 1.

The cylindrical part 220 with the bands 221, 222 thereon is disposed between the limbs, and also the pole pieces 226c, 227c, of the magnet and almost fills the space between the limbs, as shown in FIGURES 1 and 3.

The spindle 211 has a small diameter relative to its length and at its centre has a ridge 228 with slightly tapered shoulders so that the ridge decreases in axial length as it protrudes outwards. The ridge 228 engages in the groove 223 with a small clearance between the shoulders of the ridge and the sides of the groove. The spindle is engaged by the bands 221, 222 on each side of the ridge 228, the spindle being drawn against the bands by the pole pieces 226c, 227c magnetically acting upon the ends of the spindle, the magnetic circuit being completed through the spindle. The ends of the spindle finish half way across the pole pieces; as shown in FIGURE 1 the ends of the spindle do not protrude past the stepped down portions 226d, 227d of the pole pieces. The diameter of the ends of the spindle is approximately equal to the narrow flat at the tip 226d, 227d of each tapered pole piece, as shown in FIGURE 2.

In operation, the sleeve 217 is engaged and rotated by a flight of a moving endless belt (not shown). The bands 221, 222 are thereby rotated and these in turn rotate the spindle 211. Due to the large diameter of the bands 221, 222 relative to the diameter of the spindle 211, the spindle 211 is rotated at a rate many times that of the sleeve 217, for example at least 8 times or even more than 25 times. The spindle can thus be rotated at a high speed, but is held in position by the magnetic fields concentrated at the narrow tips 226d, 227d of the pole pieces acting upon the ends of the spindle. This concentration of strong magnetic fields at the narrow tips 226d, 227d prevents the spindle from moving away from its desired axis of rotation, no other retaining means being essential. Should the spindle 211 be inadvertently displaced axially, then axial movement of the spindle 211 is limited by a shoulder of the ridge 228 contacting one or other of the shoulders formed by the sides of the groove 223. Due to the slight taper of each shoulder of the ridge 228 away from the corresponding side of the groove 223, the shoulders on the ridge 228 will only contact small portions of the extremity of the sides of the groove so that the parts that contact will be moving at approximately the same peripheral speed.

It will be noticed that during rotation of the spindle 211, a small air gap exists between the tip of each pole piece and the corresponding end of the spindle, as best seen in FIGURE 1, and no moving part passes through these air gaps.

When yarn is to be false twisted it is drawn upwards or downwards through the bore in the spindle 211, the yarn passing once or more around the sapphire pin 230 across the upper end of said bore. The sleeve 217 can be rotated in either direction depending upon which direction it is desired to twist the yarn.

In the above embodiment, the diameter of the bands 221, 222 was 51 millimetres, the diameter of the spindle 211 was 3.2 millimetres, the diameter of the ridge 228 was 6.4 millimetres, the length of the spindle 211 was 29 millimetres, and the small air gap between each pole piece and the corresponding end of the spindle was 0.8 millimetre. The spindle was made of low carbon steel having a high magnetic permeability. The bands 221, 222 were made of polyurethane elastomer.

In this embodiment, the bands 221, 222 can be viewed either as two axially spaced apart wheels, or, considering the cylinder 220, as one wheel having a groove therein.

With this embodiment, the spindle 211 was rotated at very high speeds from 400,000 to 600,000 revolutions per minute.

It will now be appreciated with this embodiment that the stepped down parts 227d and 226d of the pole pieces concentrating the magnetic flux at the ends of the false twist spindle 211 in combination with the outer extremities of the track means 221, 222 in the axial direction supporting the spindle just inward of and adjacent the stepped down pole tips results in a compact and efficient high speed false twist spindle transmission means.

FIGURES 4 to 7 show embodiments similar to that shown in FIGURE 1 to 3 in which a bearing 23 passes through and is secured to a bracket 13. The bearing 23 supports a shaft (not shown) on the upper end of which is secured an inverted cup-shaped member. To the outside of the cup-shaped member are secured two bands, 24 and 26 of hard wearing rubber-like synthetic material. The bands 24 and 26 are spaced apart so that there is a groove 25 between them.

The differences between the embodiments of FIGURES 4 to 7 and FIGURES 1 to 3 which relate to the arrangement of the magnetic means will now be described.

Figure 5:
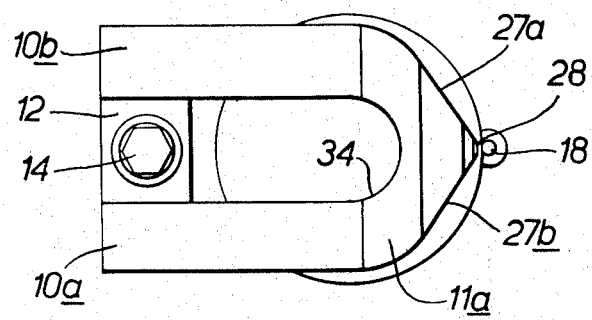
FIGURE 5 is a top plan view of the embodiment in FIGURE 4.
Figure 6:
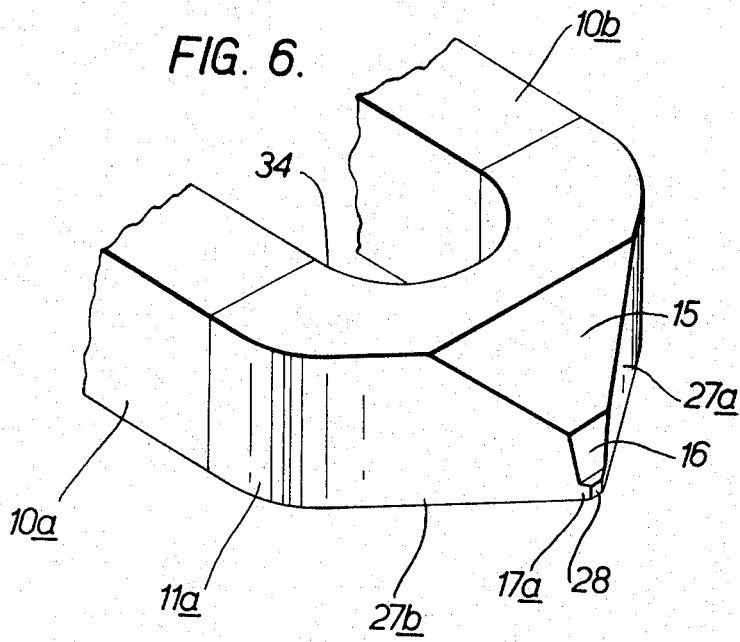
FIGURE 6 is a perspective view on a larger scale of a part of the embodiment in FIGURE 4.

Referring to FIGURE 4 two powerful horseshoe magnets 10a and 10b are secured by an adhesive to a brass block 12, the brass block being secured to the bracket 13 by means of a screw 14. The horseshoe magnets are arranged to provide parallel fingers of like polarity which together form limb portions of a magnetic arrangement, the fingers being bridged by pole pieces 11a and 11b. Each pole piece is formed with a radiused inside face 34 to minimise flux losses. As shown in FIGURES 5 and 6 the pole pieces have tapered faces 27a and 27b tapering towards tips 28. The pole pieces also have tapered faces 15 and 16 as shown in FIGURES 4 and 6. Face 16 is at a small angle to the axis of spindle 18 and the pole tips 28 are formed on stepped down portions forming small tongues 17a and 17b.

The bands 24 and 26 are disposed within and adjacent the pole pieces 11a and 11b, the bands protruding slightly beyond the pole tips 28. The spindle 18 is hollow and has a small diameter relative to its length and is provided with a ridge 21 having slightly tapered shoulders 22a and 22b so that the ridge decreases in axial length as it protrudes outwards. The ridge 21 lies within the groove 25 with a clearance between the ridge and the groove. The spindle 18 is engaged by the bands 24 and 26 on each side of the ridge 21, the spindle being drawn against the bands by the pole pieces 11a and 11b magnetically acting upon the ends of the spindle. A slot 20 is cut across one end of the spindle and across the slot extends a sapphire pin.

The magnets 10a and 10b were formed of Alnico material and the pole pieces 11a and 11b were formed of soft iron having a high magnetic permeability. As shown in FIGURE 4 the tongue 17a is in operation adjacent the upper end of the spindle 18. The tongue 17b is adjacent the lower end of the spindle, only that part of the spindle 18 in which the slot 21 is formed extending beyond the tongue 17b. It will be appreciated that the portion extending beyond the tongue which also has the sapphire pin secured therein is in effect substantially reduced in its capacity to pass magnetic flux. The outermost face of the tongue 17b is therefore arranged to be adjacent the bottom of the slot 21.

In operation the sides 22a and 22b of the ridge 21 only contact sides of the groove 25 when the spindle is inadvertently dislodged axially for some reason, the clearance between the faces and the groove being large enough to accommodate axial movement of the spindle such as can result from small irregularities in the yarn, the tension in the yarn and in the grip of the yarn on the sapphire pin. Within the limits imposed by the clearance between the ridge and the groove the magnetic flux restores the spindle to the operating position.

In the above embodiment the diameter of the bands 24, 26 was 51 millimetres, the diameter of the spindle 18 was 3.2 millimetres, the diameter of the ridge 21 was 5.1 millimeters, the length of the spindle was 23.8 millimetres and the air gap between each pole tip and the spindle was 0.4 millimeter. The spindle had a bore of 1 millimetre diameter; the slot in one end of the spindle was 1.3 millimetres wide and 2.3 millimetres deep. The bore of the spindle was enlarged to 2.3 millimetres diameter for the depth of the slot to further reduce the amount of material extending beyond the tongue 17b. The sapphire pin was 1.3 millimetres diameter.

The distance between the inner faces of the tongues 17a and 17b was 18.4 millimetres and the tips 28 were 1.5 millimetres long in the axial direction and 0.9 millimetre wide. The distance between the bands and the inner faces of the tongues was 0.5 millimetre on each side. The clearance between the sides of the ridge 21 and the sides of the groove 25 was 1.1 millimetres on each side. Each of the fingers formed by the horseshoe magnets was 15.9 millimetres high by 12.2 millimetres wide. The flux density of each finger was 1500 gauss.

With transmission means according to this embodiment the false twist spindle was run at speeds of 420,000 r.p.m. to over 600,000 r.p.m.

Figure 7:
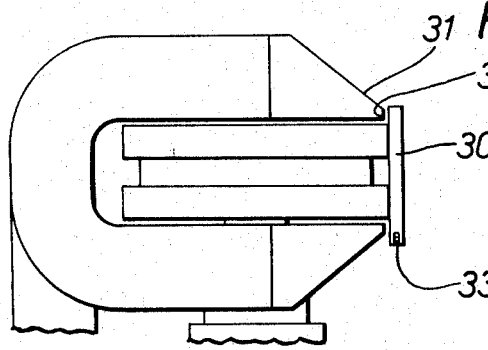
FIGURE 7 is part of an elevation similar to FIGURE 4 of yet another embodiment.

FIGURE 7 shows a further embodiment similar to that shown in FIGURES 4 to 6 but in which the pole pieces are formed with a single tapered face 31 as shown in elevation to form tips 32. The pole pieces are also tapered to their tips substantially as shown in FIGURE 5. The hollow false twist spindle 30 was of plain diameter through its length and was formed with a slot 33 at one end, a sapphire pin extending across the slot.

In this embodiment the spindle was 3.2 millimetres diameter and was 25.3 millimetres long. The tips 32 were 2.3 millimetres long in the axial direction of the spindle and 0.9 millimetre wide. All other dimensions were as stated above for the embodiment shown in FIGURES 4 to 6.

In order to run the false twist spindle of any of the above embodiments at very high speeds it will be appreciated that the tips of the pole pieces should be precisely arranged so that the spindle takes up a position during operation with its axis parallel with the axis of rotation of the bands.

What is claimed is:

1. A device for use in false twisting yarn comprising two horseshoe magnets disposed side by side with like poles adjacent and bridged by pole pieces of material having a higher magnetic permeability than that of the magnets, the pole pieces each reducing to a tip of small area to concentrate the magnetic flux at said tip, track means passing between the two pole pieces and being supported by a shaft extending between the two horseshoe magnets and being rotatable about an axis parallel to the general direction of the magnetic field between said tips, and a false twist spindle drawn by the concentrated magnetic flux at said tips into contact with said track means, there being a small air gap between each tip and the spindle.

2. Transmission means for supporting and rotating a false twist spindle for use in false twisting yarn, said transmission means comprising track means for contacting and rotating the spindle, magnetic means for drawing the spindle into contact with the track means, the magnetic means having two limb portions which end in pole pieces, each limb portion having two fingers connected by the appropriate pole piece, the fingers being spaced apart in a direction perpendicular to the axis of the spindle and forming part of a permanent magnet system, the pole pieces being spaced apart with the track means passing between them and a shaft for supporting the track means passing through the space between the fingers of at least one limb portion, each pole piece being stepped down in the direction of the axis of the spindle to form a tongue having two surfaces in planes substantially perpendicular to the axis of the spindle and a third surface joining these and disposed substantially opposite an end of the spindle to form a tip the area of which is small relative to the cross-sectional area of the associated limb portion.

3. The device in accordance with claim 2 wherein the dimension between the planes of the outermost surfaces of said pole pieces is at least as great as the length of the spindle whereby the spindle does not extend axially beyond the planes of the outermost surfaces of said pole pieces.

4. A device for use in false twisting yarn, comprising a false twist spindle; track means for contacting and rotating the false twist spindle and being rotatable about a single axis; magnetic means having two magnetic flux directing portions terminating in pole pieces of material of high magnetic permeability, said pole pieces being spaced apart in a direction parallel to the axis of the track means and each of said pole pieces being stepped down to form a tongue having two surfaces in planes substantially perpendicular to the axis of the spindle and a third surface joining these two surfaces to define a tip, the area of each of said third surfaces being small relative to the cross-sectional area of the associated flux directing portion, the tips being disposed opposite the end parts of the false twist spindle and magnetically acting thereupon to draw the false twist spindle against the track means and hold the false twist spindle in that position.

5. A device as claimed in claim 4 in which each said tip has a length in the axial direction of the false twist spindle of less than one seventh of the length of each flux directing portion in the axial direction of the spindle.

6. A device for the use in false twisting yarn comprising a permanent magnet system having magnetic flux directing portions terminating in two pole pieces of material of high magnetic permeability, the pole pieces being stepped down in the direction of the axis of the spindle to form a tongue having two surfaces in planes substantially perpendicular to the axis of the spindle and a third surface joining these two surfaces to define a small tip, the area of each of said third surfaces being small relative to the cross-sectional area of the associated flux directing portion; a wheel member disposed between the pole pieces and protruding a distance not greater than 0.03 inch past the tips, the wheel member substantially filling the gap between the pole pieces; and a false twist spindle having its ends substantially opposite said tips and completing a magnetic circuit between said tips and thereby being drawn into contact with the wheel member with an air gap between each tongue and the end of the spindle opposite it.

7. A device as claimed in claim 6 in which said air gap is between 0.01 and 0.02 inch.

8. Transmission means for supporting and rotating a false twist spindle for use in false twisting yarn, said transmission means comprising track means for contacting and rotating the spindle, magnetic means for drawing the spindle into contact with the track means, the magnetic means having two limb portions which end in pole pieces, the pole pieces being spaced apart with the track means passing between them, each said pole piece being stepped down in the direction of the axis of the spindle to form a tongue having two surfaces in planes substantially perpendicular to the axis of the spindle and a third surface joining these two surfaces to define a tip.

9. The apparatus in accordance with claim 8 wherein each said tongue includes sidewalls joining said surfaces, said side walls converging toward the axis of said spindles.

10. The apparatus in accordance with claim 9 wherein said sidewalls extend to form the sides of said pole pieces and are joined by at least one other surface converging toward said tongue.

11. The apparatus in accordance with claim 8 wherein with respect to said pole pieces, said tips have a cross sectional area that is reduced in a first direction parallel to the spindle axis and in a second direction that is perpendicular to the spindle axis.

12. The apparatus in accordance with claim 8 wherein each said limb portion includes a pair of fingers spaced apart in a direction transverse to the spacing of said limbs, each of said pole pieces connecting one pair of said fingers.

13. A device for supporting and rotating a false twist spindle, said device comprising a wheel member mounted on a rotatable shaft, a horseshoe magnet arrangement having two limbs each ending in a pole piece, said wheel member being disposed between said two limbs and having its periphery protruding slightly beyond said pole pieces which are arranged apart in a direction substantially parallel to the axis of rotation of said wheel member, said pole pieces magnetically acting upon the ends of the false twist spindle on opposite sides of said wheel member to draw the false twist spindle against said wheel member and hold the false twist spindle in that position with a small gap between each said pole piece and the end of the spindle opposite it, the planes of the outermost surfaces of said pole pieces being spaced apart by a dimension at least as great as the length of the spindle whereby the spindle does not extend axially beyond the planes of the outermost surfaces of said pole pieces.

14. The device in accordance with claim 8 wherein the dimension between the planes of the outermost surfaces of said pole pieces is at least as great as the length of the spindle whereby the spindle does not extend axially beyond the planes of the outermost surfaces of said pole pieces.

15. The device in accordance with claim 1 wherein the axial length of said spindle is not greater than the dimension between the planes of the outermost surfaces of said pole pieces.

References Cited

UNITED STATES PATENTS

| | | | |
|---|---|---|---|
| 687,428 | 11/1901 | Heinze | 74—210 |
| 3,058,289 | 10/1962 | Raschle | 57—77.45 X |
| 3,059,408 | 10/1962 | Hippe et al. | 57—77.45 |
| 3,142,953 | 8/1964 | Gassner et al. | 57—77.45 |
| 3,232,037 | 2/1966 | Crouzet | 57—77.45 |

FOREIGN PATENTS

| | | |
|---|---|---|
| 1,239,013 | 7/1960 | France. |
| 860,369 | 2/1961 | Great Britain. |
| 938,457 | 10/1963 | Great Britain. |

FRANK J. COHEN, *Primary Examiner.*